(12) United States Patent
Pflueger et al.

(10) Patent No.: US 10,483,511 B2
(45) Date of Patent: Nov. 19, 2019

(54) METHOD FOR INSULATING A BATTERY MODULE

(71) Applicant: Robert Bosch GmbH, Stuttgart (DE)

(72) Inventors: Claus Gerald Pflueger, Markröningen (DE); Klaus Wipfler, Niefern-Oeschelbronn (DE); Timo Kegel, Memmelsdorf (DE); Tomas Korinek, Kornwestheim (DE); Torsten Koller, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 15/416,039

(22) Filed: Jan. 26, 2017

(65) Prior Publication Data

US 2017/0214017 A1    Jul. 27, 2017

(30) Foreign Application Priority Data

Jan. 27, 2016  (DE) .................. 10 2016 201 199

(51) Int. Cl.
  *H01M 2/10*     (2006.01)
  *H01M 10/658*   (2014.01)
  *H01M 10/48*    (2006.01)

(52) U.S. Cl.
  CPC ....... *H01M 2/1094* (2013.01); *H01M 10/658* (2015.04); *H01M 10/486* (2013.01)

(58) Field of Classification Search
  CPC .......................... H01M 2/0275; H01M 2/0277
  See application file for complete search history.

(56) References Cited

U.S. PATENT DOCUMENTS

| | | | | |
|---|---|---|---|---|
| 2011/0003198 A1* | 1/2011 | Noda | ........... | H01G 9/08 429/185 |
| 2012/0160559 A1* | 6/2012 | Tsutsumi | ........... | H01M 2/021 174/551 |
| 2013/0034764 A1* | 2/2013 | Ochi | ........... | H01M 2/0262 429/99 |
| 2014/0308555 A1* | 10/2014 | Hattori | ........... | H01M 10/0431 429/94 |
| 2015/0270515 A1* | 9/2015 | Shin | ........... | H01M 2/0267 429/178 |

FOREIGN PATENT DOCUMENTS

DE     102013200588     7/2013

* cited by examiner

*Primary Examiner* — Maria Laios
(74) *Attorney, Agent, or Firm* — Michael Best & Friedrich LLP

(57) ABSTRACT

A method for insulating a battery module (100) which has a multiplicity of battery cells (10), having at least one foldable insulation element (20), having at least the following steps:
a) forming a receptacle pocket (21) from the insulation element (20) for receiving at least one battery cell (10),
b) closing the receptacle pocket (21) by means of attachment sections (22) which are arranged laterally on the insulation element (20), as a result of which the battery cell (10) is surrounded at least on five sides by the insulation element (20), as a result of which the individual battery cell (10) is insulated with respect to an adjacent battery cell (10).

15 Claims, 4 Drawing Sheets

METHOD FOR INSULATING A BATTERY MODULE

BACKGROUND OF THE INVENTION

The present invention relates to a method for insulating a battery module, and to a battery module.

Battery modules are usually composed of a multiplicity of battery cells which are connected in series or in parallel to form a battery module. What are referred to as hard case cells have a metallic housing, wherein in order to provide galvanic insulation the battery housing is usually connected to a battery terminal (anode), so that corrosion of the battery housing of the hard case cell can be essentially avoided. Owing to the connection of the metallic hard case cell to the one electrode, it is not possible to handle the battery cell or the battery module without safety precautions, making it necessary to insulate the hard case cell, at least electrically, with insulation means. Conventionally, protective surface coatings are applied to the hard case cell for this, wherein each individual cell has to be provided with the surface coating in order therefore to ensure electrical insulation with respect to a user, among other things. This type of insulation must satisfy at the same time the requirements during the operation of the battery cell, wherein large temperature fluctuations and, in particular, resistance to heat are necessary.

SUMMARY OF THE INVENTION

The method according to the invention for insulating a battery module which has a multiplicity of battery cells, having at least one foldable insulation element, has at least the following steps:
  a) forming a receptacle pocket from the insulation element for receiving at least one battery cell,
  b) closing the receptacle pocket by means of attachment sections which are arranged laterally on the insulation element, as a result of which the battery cell is surrounded at least on five sides by the insulation element, as a result of which the individual battery cell is insulated with respect to an adjacent battery cell.

Further features and details of the invention can be found in the claims, the description and the drawings. In this context, features and details which have been described in relation to the method according to the invention also apply, of course, in relation to the battery module according to the invention, and vice versa, with the result that with respect to the disclosure reference always is, or always can be, made reciprocally to the individual aspects of the invention.

The method according to the invention therefore permits a multiplicity of battery cells to be insulated from one another individually—that is to say separately—and in a simple way, permitting reliable (in particular electrical) insulation of the battery cell on at least five sides with respect to an adjacent battery cell and/or a user. The foldable insulation element is configured here in such a way that in order to form the receptacle pocket from the insulation element, the latter can be adapted by folding, at least in certain sections along the outer contour of the battery cell, in particular of the hard case cell. In this context, there may be provision according to the invention that the insulation element has, at least in certain sections, impressions and/or preshaped folding contours along which the insulation element can be folded along the outer contour of the battery cell. However, a battery cell is not absolutely necessary to form the receptacle pocket from the insulation element. Accordingly, the receptacle pocket can be produced without a battery cell. In a further method step, the receptacle pocket can be closed by means of attachment sections which are arranged laterally on the insulation element, with the result that the receptacle pocket or receptacle compartment which is formed surrounds the battery cell on at least five sides (in particular completely enclosed) by the insulation element. In this context, the receptacle pocket which is formed has essentially the geometry of the battery cell, with the result that the insulation element essentially completely surrounds the battery cell on at least five sides. Closing the receptacle pocket increases the stability of the (correctly shaped/folded) insulation element with the result that the receptacle pocket which is formed preferably does not collapse into itself, in particular as long as there is no battery cell contained in it, but instead is embodied in a dimensionally stable fashion. As a result, it is possible to cause the battery cell to be accommodated easily in the receptacle pocket without the receptacle pocket having to be additionally secured. Generic battery modules are usually composed of a multiplicity of battery cells which are connected in series or in parallel, with the result that the method is preferably repeated until at least all the battery cells are surrounded by the insulation element.

The insulation element is advantageously an endless film, wherein in a step a') at least a first battery cell is positioned on the insulation element. The endless film is preferably wound onto a reel, with the result that the insulation element can be easily unrolled in step a'). The step a') is correspondingly carried out before the step a), wherein after the unrolling of the insulation element at least a first battery cell is positioned on the insulation element, in particular along a prefabricated impression or folding edge. The insulation element is in this context configured in a flexible way such that it can be wound as an endless film onto a reel and correspondingly can be wound onto the reel and/or unwound therefrom, preferably in an automated fashion. According to the invention, the insulation element in the form of an endless film is consequently unrolled, in particular unwound from the reel, at least to such an extent that the unrolled section of the insulation element is dimensioned in such a way that the receptacle pocket can be formed from the section, with the result that the battery cell is surrounded by the insulation element on at least five sides. It is also conceivable that the unrolled, in particular the unwound, section of the insulation element is dimensioned in such a way that after the formation of the receptacle pocket there is sufficient insulation element present, with the result that the insulation element also surrounds the battery cell on the sixth side thereof. This ensures that the battery cell is at least essentially insulated on all sides from the insulation element.

In a step a") the insulation element can advantageously be folded at least along the standing face edges of the battery cell, in particular the insulation element is formed by folding along an edge orthogonal in a double layer between at least two battery cells. The term standing face edges is to be understood within the scope of the invention as meaning those edges of the battery cell with which the battery cell is positioned on the insulation element and along which the insulation element is folded in such a way that after the folding the insulation element surrounds the battery cell on at least five sides. Correspondingly, the standing face edges of the battery cell are formed by the edges of the longitudinal side and the broad side of the battery. Consequently, after positioning of the battery cell on the insulation element, a first side, the standing face of the battery cell, is covered by the insulation element. If the folding of the insulation element along the standing face edges is then carried out in the opposite direction to the standing face, it is ensured that the insulation element surrounds the battery cell on at least four further sides of the battery cell. Correspondingly, the battery cell is arranged on the standing face and on the adjoining side faces of the battery cell or of the battery cell housing. Furthermore, it is conceivable that the insulation element is dimensioned in such a way that, in addition to the previous five faces (1 standing face and 4 side faces) of the battery cell, the insulation element is at least partially or even completely surrounded the last face (cover), which lies opposite the standing face of the battery cell, by the insulation element. In this context, the insulation element can be folded along the edges of the face lying opposite the standing face of the battery cell. This face which lies opposite the standing face is referred to below as the cover of the battery cell. Furthermore, the terminal poles of the battery cell can be arranged on the cover. Within the scope of the invention, said terminal poles can also be at least partially surrounded by the insulation element, wherein, in particular, cutouts can be provided in the cover face (cover) of the insulation element.

The attachment sections in step b) can advantageously be bonded, welded and/or sewn at least in certain sections. In this context it is conceivable that the attachment sections are arranged along the broad sides and/or the longitudinal sides of the battery cell. The attachment sections are preferably located along the broad side of the battery cell. According to the invention, the attachment sections are preferably embodied in one piece, in particular with uniform material, with the insulation element. In this context, the attachment sections can have bonding agent, with the result that bonding faces, along which the insulation element can be bonded, are present on the attachment sections. Furthermore, it is conceivable that a bonding agent is subsequently applied to the attachment sections, with the result that it is possible to bond the attachment sections and therefore the insulation element. It is also conceivable that the attachment sections of the insulation element are welded, wherein by inputting thermal energy into the material of the insulation element or of the attachment sections the attachment sections and the insulation element can be thermally bonded to one another, as a result of which a frictionally locking and positively locking connection is achieved at least on certain parts of the attachment sections. Furthermore, it is conceivable that the attachment sections are sewn. Within the scope of the invention, the term attachment sections is to be understood as referring to a part of the insulation element which is embodied in such a way that the attachment sections have, on the longitudinal side or the broad side of the battery cell, a hem line and/or an overlap as a result of the folding. Along the hem line, at least two attachment sections of the insulation element can be bonded and/or welded to one another. If at least two attachment sections overlap on the longitudinal side or the broad side of the battery cell, these overlapping attachment sections can be bonded, welded and/or sewn.

According to a further aspect of the invention, a battery module is claimed, wherein the battery module has a multiplicity of battery cells which are insulated from one another by means of an insulating element, wherein the insulation is manufactured in accordance with a method according to the invention. Therefore, the battery module in accordance with the invention provides the same advantages as have been described in detail with respect to the method according to the invention.

It is conceivable according to the invention that the insulation element has a plastic, in particular a fiber-reinforced plastic, which is embodied, in particular, in a transparent or translucent fashion, at least in certain sections, wherein, in particular, the insulation element material has cutouts, as a result of which the geometry of the insulation element can be adapted to the geometry of the battery cell. Furthermore, it is conceivable that the insulation element and/or the attachment sections have, at least in certain sections, material reinforcements and/or are embodied in a watertight fashion. An insulation element which is embodied in a transparent or translucent fashion is advantageous, since changes to the battery cell and damage or escaping of the electrolyte can be detected from the outside without damaging the insulation element or having to remove the battery cell from the insulation element. Furthermore, it is advantageous if the insulation element has material cutouts. Material cutouts can be here e.g. cutouts for the terminal poles of the battery cell. Furthermore, material cutouts can be a punched shape of the insulation element, wherein, in particular, the attachment sections are formed from the insulation element by means of a punching method. It is thereby ensured that the insulation element and/or the attachment sections are shaped in such a way that they are adapted to the geometry of the battery cell, with the result that by folding the insulation element and/or the attachment sections along the edges of the battery cell, said edges are preferably completely surrounded by the insulation element. Furthermore, it is possible to obtain the advantage that by means of a punched-out insulation element and the resulting material cutouts it is possible to essentially avoid the formation of folds or an excessively large amount of surplus material, which is undesired and can unnecessarily increase material costs. Inventive material reinforcements of the insulation element can improve the mechanical loadability of the insulation element, with the result that during transportation and/or in the case of a force effect from the outside (for example sharp or blunt objects) can be essentially avoided by the material reinforcement. It is particularly preferred if the insulation element is embodied in a watertight fashion, with the result that it is essentially possible to prevent the electrolyte from escaping and a fluid from entering from the outside into the insulation element, and in particular into the receptacle pocket which is formed.

Furthermore, it is conceivable that the insulation element is cut into a suitable shape, in particular, by means of a laser. Correspondingly, the film can be cut in accordance with a cutting pattern and by means of a cutting process, e.g. a laser, and thereby adapted.

Within the scope of the invention it is conceivable that at least one receptacle element for receiving a transportation means is arranged on the insulation element, in particular on the attachment sections. The receptacle elements can be embodied here, for example, in the form of a clip on the insulation element, with the result that the insulation element, in particular the folded insulation element which is embodied with the receptacle pockets, can preferably be transported using a transportation means after being filled with battery cells. In this context, the transportation means can be, for example, a robot arm or similar aids which are suitable for transporting a battery module. The receptacle element can preferably have reinforcements here, with the result that, when the battery module is transported and as a result of mechanically occurring forces, damage to the insulation element can be prevented owing to the reinforcements.

According to the invention, it is also conceivable that the insulation element is a shrink-fit film, as a result of which positive engagement with the at least one battery cell can be achieved. If the insulation element is embodied as a shrink-fit film, the shrink-fit film which is preferably manufactured from plastic is shrunk to a large extent under the effect of heat, in particular hot air. This brings about positive engagement of the film or of the insulation element with the at least one battery cell, with the result that said battery cell is electrically insulated from the surroundings and protected against mechanical damage.

A thermocouple can advantageously be arranged on the insulation element, wherein the temperature of the battery cell can be controlled by means of the thermocouple. The thermocouple can be a component which is designed to conduct thermal energy, with the result that heat can be directed away from or toward the battery cell. Correspondingly, the battery cell or the battery cells can be cooled or heated by means of the thermocouple. This has the advantage that the battery cells can be kept at the operating temperature, with the result that it is possible to avoid both overheating and an excessively low operating temperature of the battery cells, and therefore to limit the efficiency of the battery cells.

The insulation element can advantageously have a thickness between approximately 50 μm and approximately 1000 μm, preferably between approximately 100 μm and approximately 700 μm, particularly preferably between approximately 200 μm and approximately 400 μm. The thinner the material of the insulation element, the easier it is to fold the insulation element or adapt it to the shape of the battery cell. A relatively large thickness of the insulation element is, on the other hand, better electrical insulation properties and the protection against mechanical force effects with the result that both the battery cell and a user of the battery cell are better protected by a relatively thick insulation element. Furthermore, a relatively thin insulation element can be manufactured more cost-effectively, with the result that the manufacturing costs for the insulation element, and therefore of the battery module, can be reduced with insulation according to the invention.

BRIEF DESCRIPTION OF THE DRAWINGS

Further measures which improve the invention can be found in the following description of a number of exemplary embodiments of the invention which are illustrated schematically in the figures. All of the features and/or advantages which arise from the claims, the description or the drawings, including structural details, spatial arrangements and method steps, can be essential to the invention both per se and in a wide variety of combinations. It is to be noted here that the figures only have a descriptive character and are not intended to limit the invention in any way. In the following figures, identical reference symbols are used for the same technical features, even of different exemplary embodiments. In the drawings, in a schematic form:

DETAILED DESCRIPTION

Figure 1:
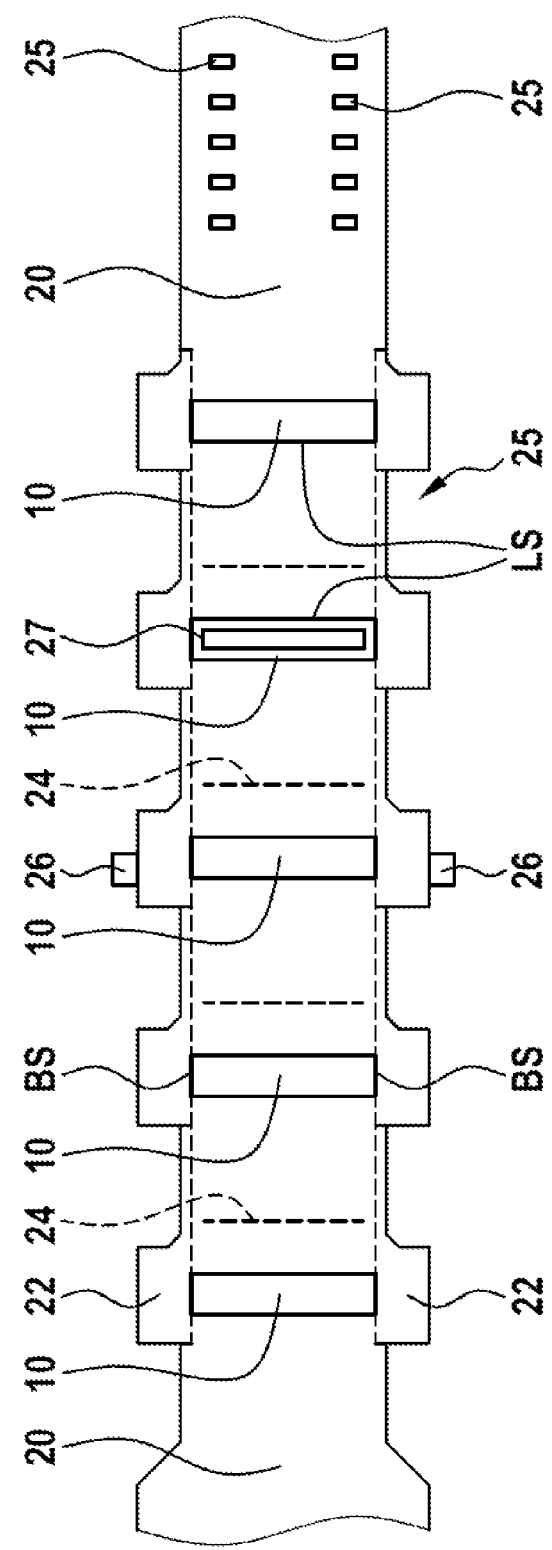
FIG. 1 shows an unrolled insulation element according to the invention in a first method step.

FIG. 1 shows the insulation element 20 in an unrolled state, wherein a multiplicity of battery cells 10 are arranged spaced apart from one another on the insulation element 20. The battery cells 10 are arranged here on the insulation element 20, in the regions at which the attachment sections 22 are located. The insulation element 20 is embodied in FIG. 1 as a punched or laser-cut film 20, with the result that the attachment sections 22 extend over the dimension of the battery cells 10. Accordingly, the attachment sections 22 form wing-like sections on the insulation element 20. In the left-hand region of FIG. 1, a first battery cell 10 is arranged on the insulation element 20, in the region of the attachment sections 22. The battery cell 10 is arranged here essentially centrally between the attachment sections 22 on the insulation element 20. The insulation element 20 has in total ten attachment sections 22 in FIG. 1, wherein in each case two attachment sections 22 respectively extend in the region of a battery cell 10, on both sides in the region of the broad side BS of the battery cells 10. Furthermore, FIG. 1 shows the edge orthogonal 24 which is arranged spaced apart between the first battery cell 10 and the second battery cell 10 which is spaced apart therefrom and is illustrated here by dashed lines. In a further method step, the insulation element 20 is folded along the edge orthogonal 24 in such a way that the insulation element 20 is embodied in a double layer between the first battery cell 10 and the second battery cell 10 which is indicated by dashed lines. On the third attachment section 22, in FIG. 1 a receptacle element 26 is arranged which is located in the form of a clip 26, in each case on the outer edge of the attachment section 22. If the attachment section 22 is then folded along the broad side BS of the battery cell 10, the receptacle sections 26 form a possible way of lifting the battery cells 10 into the receptacle pockets 21 which are formed, and therefore of transporting said battery cells 10. Furthermore, arranged on the insulation element 20 there is a thermocouple 27 which is arranged in such a way that the battery cell 10 can be arranged thereon, with the result that thermal conductivity can be brought about between the battery cell 10 and the thermocouple 27. The thermocouple 27 preferably has the dimension of the battery cell 10 along the standing face of the battery cell 10, which dimension is formed by the standing face edges 23 of the battery cell 10. In addition to the material cutouts 25 between the attachment sections 22, further material cutouts 25 are located on the insulation element 20, at one end of the insulation element 20. This end of the insulation element 20 is shown on the right-hand side in FIG. 1, wherein the material cutouts 25 in this region serve as a receptacle for the terminal poles of the battery cell 10. Therefore, the section with the material cutouts 25 for the terminal poles for the battery cell 10 can be folded in a further method step in such a way that the pole terminals of the battery cells 10 extend through the material cutout 25, with the result that, after the receptacle pockets 21 have been formed and the receptacle pockets 21 have been closed, only the pole terminals of the battery cells 10 extend out of the insulation element 20. Correspondingly, the rest of the battery cells 10 are completely encased by the insulation element 20.

Figure 2:
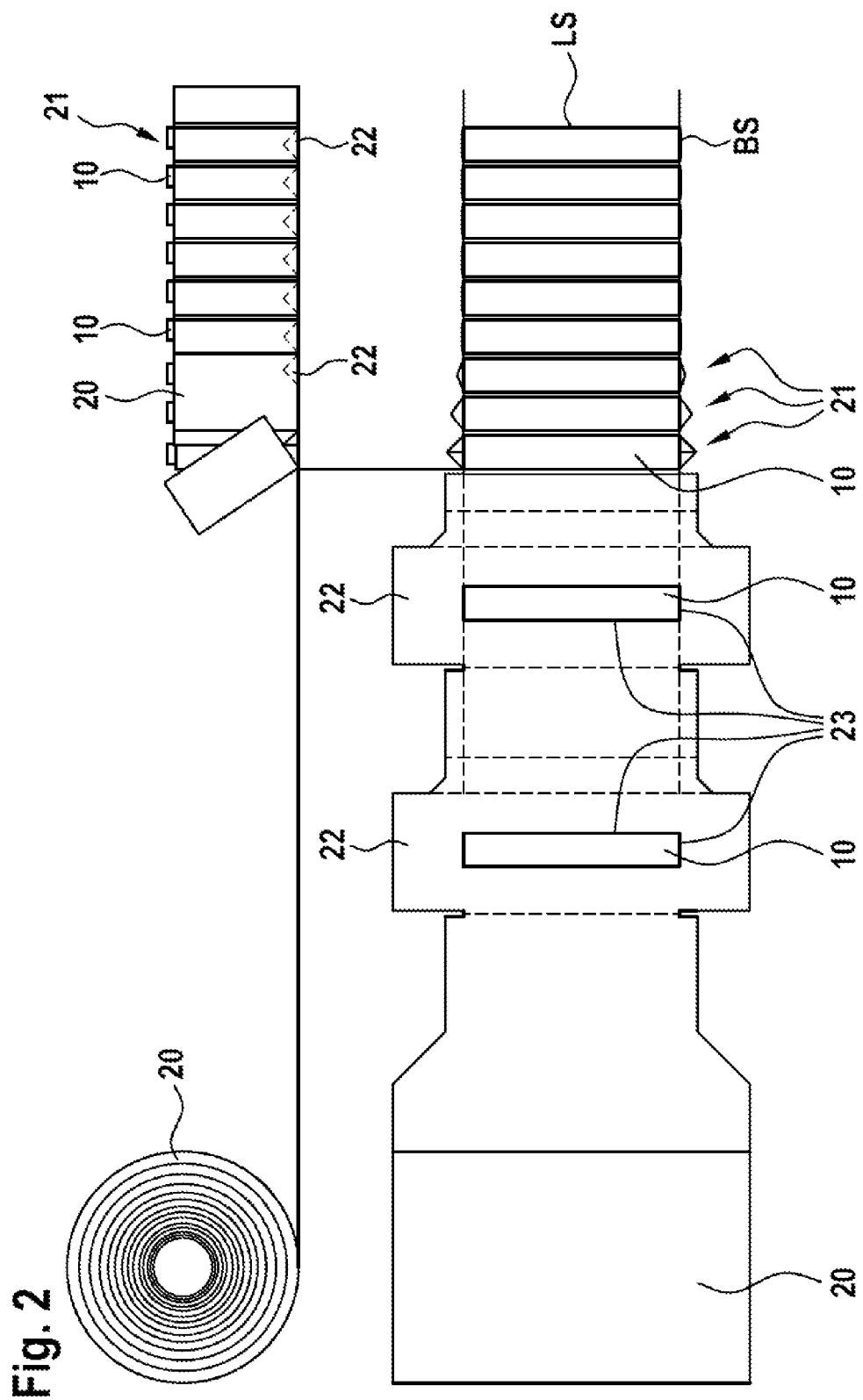
FIG. 2 shows the insulation element according to the invention in a second method step.

FIG. 2 shows the insulation element 20 according to the invention in a further method step. Here, in the upper region of the figure the insulation element 20 is illustrated in the left-hand region of FIG. 2 as an unrolled insulation element 20.

The already unrolled part of the insulation element 20 which is located in the right-hand half of FIG. 2 shows the completely formed receptacle pockets 21 with the battery cells 10 arranged therein. In the lower region of FIG. 2, the rolled-up insulation element 20 is shown in a plan view in the left-hand region, wherein the unrolled part of the insulation element 20 which extends therefrom has the same shape as in FIG. 1. In FIG. 2, two battery cells 10 are arranged on the already unrolled insulation element 20. In this context, the battery cells 10 are arranged on the insulation element 20 in such a way that the attachment sections 22 extend on at least two sides of the battery cell broad side BS. The attachment sections 22 are therefore folded in a further method step along the broad side BS and therefore the first standing face edge 23. However, the insulation element 20 is previously folded along the longitudinal side LS and therefore along the standing face edge 23 in such a way that the insulation element 20 extends along the longitudinal face which is located on the longitudinal side of the battery cells. In a further step the insulation element 20 is folded again along the edge orthogonal 24, with the result that the insulation element 20 is formed in a double layer between the battery cells 10. In the lower right-hand region of FIG. 2, the completely constructed receptacle pockets 21 are shown with the battery cells 10 arranged therein. In this context, adjacent to the battery cells 10 there are the attachment sections 22 which extend in a pyramid shape from the battery cell 10. The attachment sections 22 which are therefore formed in a pyramid shape can be bonded, welded or sewn according to the invention.

Figure 3:
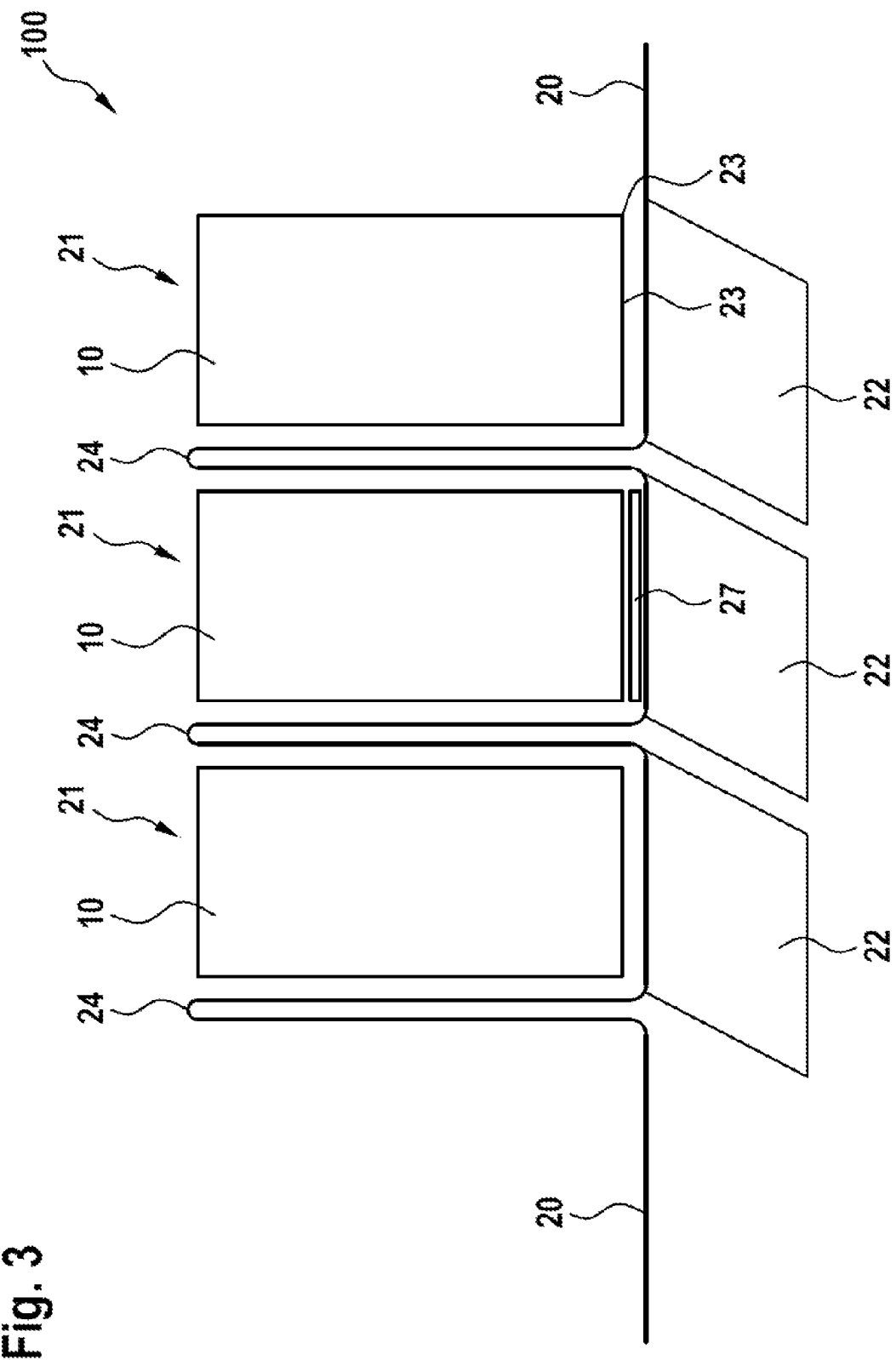
FIG. 3 shows a battery module according to the invention.

FIG. 3 shows a battery module 100 according to the invention having a total of three battery cells 10, and the insulation element 20 which extends in each case in a double layer between the battery cells 10. The receptacle pockets 21, which are located between the insulation element 20 which is embodied in a double layer, are arranged in FIG. 3. In this context, it is apparent in FIG. 3 that by folding the insulation element 20 along the edge orthogonal 24 the insulation element 20 is formed in a double layer before and/or between the battery cells 10. The battery cells 10 are shown in FIG. 3 from a side view, with the result that the face of the broad side BS of the battery cell 10 is shown. In the region of the battery cells 10 the attachment sections 22 are located on the insulation element 20, wherein the attachment sections 22 are configured in such a way that the latter completely cover the illustrated face of the broad side BS of the battery cell 10 when the attachment section 22 is folded. FIG. 3 also shows a thermocouple 27 which is located underneath the battery cell 10 which is arranged in the center in FIG. 3. According to the invention, it is also conceivable that the thermocouple 27 is located outside the insulation element 20. In FIG. 3 it is also apparent that the insulation element 20 is folded along the standing face edges 23 and along the edge orthogonals 24. In this context, the insulation element 20 is firstly folded along the standing face edge 23 of the longitudinal side LS of the battery cell 10, wherein in a subsequent step the insulation element 20 is folded again along the edge orthogonal 24. According to this, it is conceivable according to the invention that the battery cell 10 is arranged on the subsequent insulation element section, with the result that folding is carried out again on the standing face edge 23 along the longitudinal side LS of the subsequent battery cell 10. This process can be continued as desired, wherein according to the invention preferably five battery cells 10 are arranged on the insulation element 20, with the result that a battery module 100 with a total of five battery cells 10 is formed. The attachment sections 22 are folded according to the invention along the standing face edge 23 on the broad side BS of the battery cell 10. The attachment sections 22 can subsequently be welded, bonded or sewn to the insulation element 20 along the broad side face of the battery cell 10.

Figure 4:
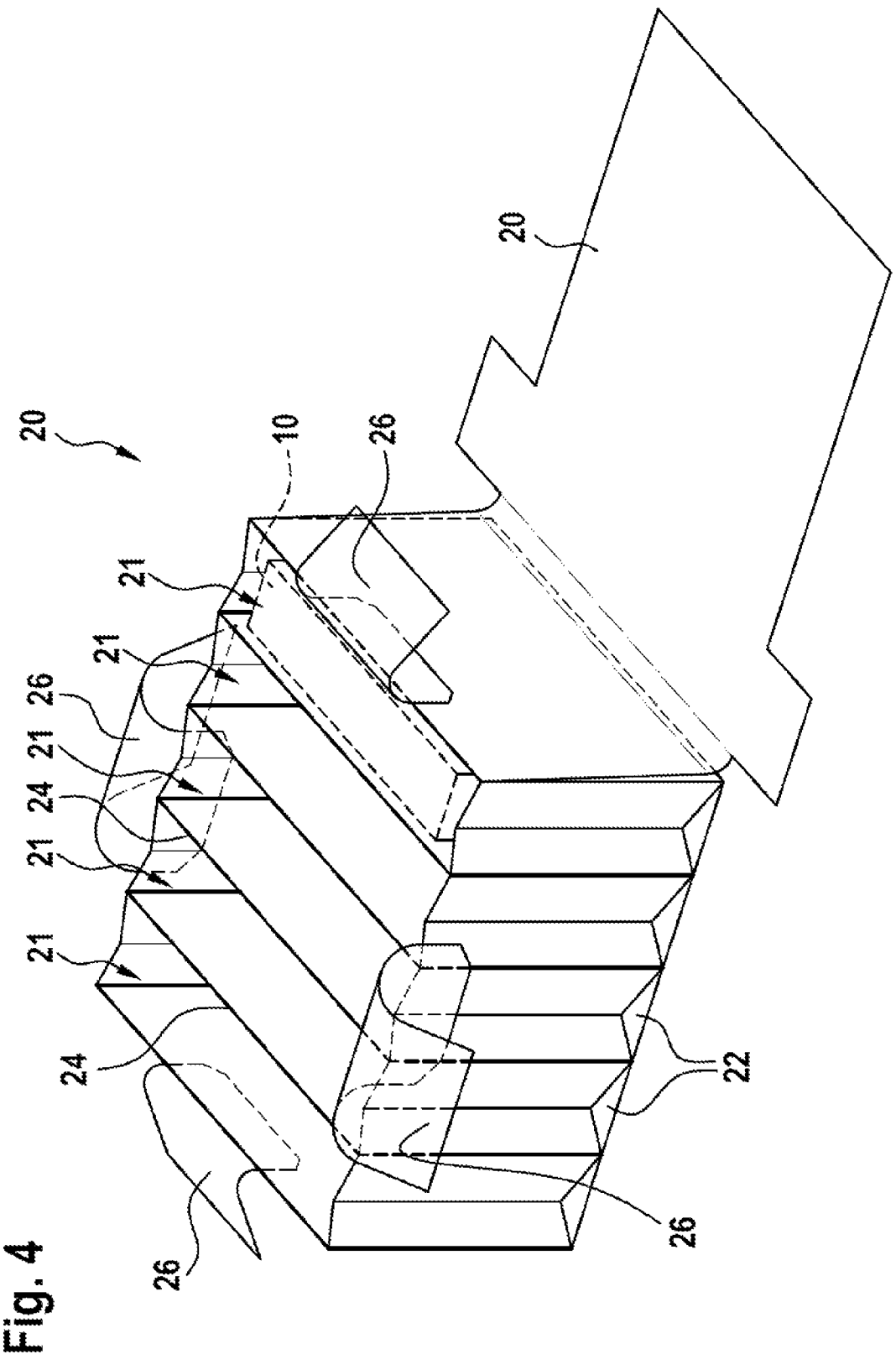
FIG. 4 shows a receptacle pocket, manufactured according to the inventive method, from the insulation element.

FIG. 4 shows the completely constructed receptacle pockets 21 in the insulation element 20. In this context, the insulation element 20 has, in an upper region, in each case four receptacle elements 26 in the form of clips 26. Furthermore, the insulation element 20 has, in the right-hand region of FIG. 4, a cover section which, after the receptacle pockets 21 have been filled with the battery cells 10, can cover the latter. FIG. 4 also shows the completely constructed and welded attachment sections 22 which are located along the face of the broad side BS of the battery cells 10. Between the battery cells 10 on the receptacle pockets 21, the edge orthogonals 24 are respectively shown between the battery cells 10.

Accordingly, the receptacle pockets 21 are separated from one another between the battery cells 10 by an insulation element 22 which is constructed in a double layer. Accordingly, the configuration which is constructed in a double layer results in reliable insulation of the battery cells 10 from one another. According to the invention, the cover region of the insulation element 20 can have material cutouts 25, with the result that, in a closed state in which the cover region of the insulation element 20 is connected to the longitudinal or broad sides BS of the insulation element 20, the cover region can be arranged in such a way that only the pole terminals of the battery cells 10 extend through the cover region of the insulation element 20.

The invention claimed is:

1. A method for insulating a battery module (100) which has a multiplicity of battery cells (10), having at least one foldable insulation element (20), the method comprising at least the following steps:
    a) forming from the insulation element (20) a first receptacle pocket (21) for receiving at least one battery cell (10),
    b) closing the first receptacle pocket (21) by means of attachment sections (22) which are arranged laterally on the insulation element (20), as a result of which the battery cell (10) is surrounded at least on five sides by the insulation element (20), as a result of which the individual battery cell (10) is insulated with respect to an adjacent battery cell (10),
    c) forming from the insulation element a second receptacle pocket for receiving the adjacent battery cell, the second receptacle pocket formed from the same insulation element as the first receptacle pocket, the second receptacle pocket formed adjacent to and seamlessly connected to the first receptacle pocket via the insulation element, and
    d) closing the second receptacle pocket (21) by means of second attachment sections (22) which are arranged laterally on the insulation element (20) such that the adjacent battery cell (10) is surrounded at least on five sides by the insulation element (20) and is insulated with respect to an adjacent battery cell (10).

2. The method according to claim 1, characterized in that the insulation element (20) is a continuous film (20) wound onto a roll, wherein the insulation element (20) is unrolled in a step a').

3. The method according to claim 2, characterized in that in a step a") the insulation element (20) is folded at least along standing face edges (23) of the battery cell (10).

4. The method according to claim 1, characterized in that in a step a") the insulation element (20) is folded at least along standing face edges (23) of the battery cell (10).

5. The method according to claim 1, characterized in that the attachment sections (22) in step b) are bonded, welded and/or sewn at least in certain sections.

6. The method according to claim 1, characterized in that the insulation element (20) has a plastic and is embodied in a transparent or translucent fashion, at least in certain sections, wherein the insulation element (20) has material cutouts (25), as a result of which the geometry of the insulation element (20) can be adapted to the geometry of the battery cell (10).

7. The method according to claim 1, characterized in that at least one receptacle element (26) for receiving a transportation means is arranged on the insulation element (20).

8. The method according to claim 1, characterized in that the insulation element (20) is a shrink-fit film (20), as a result of which positive engagement can be achieved with the battery cells (10).

9. The method according to claim 1, characterized in that a thermocouple (27) can be arranged on the insulation element (20), wherein the temperature of the battery cell (10) can be controlled by means of the thermocouple (27).

10. The method according to claim 1, characterized in that the insulation element (20) has a thickness between approximately 50 μm and approximately 1000 μm.

11. The method according to claim 1, characterized in that the insulation element (20) is a continuous film (20) wound onto a roll, wherein the insulation element (20) is unrolled in a step a'), and at least a first battery cell (10) is positioned on the insulating element (20).

12. The method according to claim 1, characterized in that at least one receptacle element (26) for receiving a transportation means is arranged on the attachment sections (22).

13. The method according to claim 1, characterized in that the insulation element (20) has a thickness between approximately 100 μm and approximately 700 μm.

14. The method according to claim 1, characterized in that the insulation element (20) has a thickness between approximately 200 μm and approximately 400 μm.

15. A method for insulating a battery module (100) which has a multiplicity of battery cells (10), having at least one foldable insulation element (20), the method comprising at least the following steps:

a) forming a first receptacle pocket (21) from the insulation element (20) for receiving at least one battery cell (10), b) closing the first receptacle pocket (21) by means of attachment sections (22) which are arranged laterally on the insulation element (20), as a result of which the battery cell (10) is surrounded at least on five sides by the insulation element (20), as a result of which the individual battery cell (10) is insulated with respect to an adjacent battery cell (10), characterized in that in a step a") the insulation element (20) is folded at least along standing face edges (23) of the battery cell (10), wherein the insulation element (20) is formed by folding along an edge orthogonal (24) in a double layer between at least two battery cells (20).

* * * * *